June 14, 1927.
G. J. MORRIS
MIXING VALVE
Filed Dec. 23, 1925
1,632,450
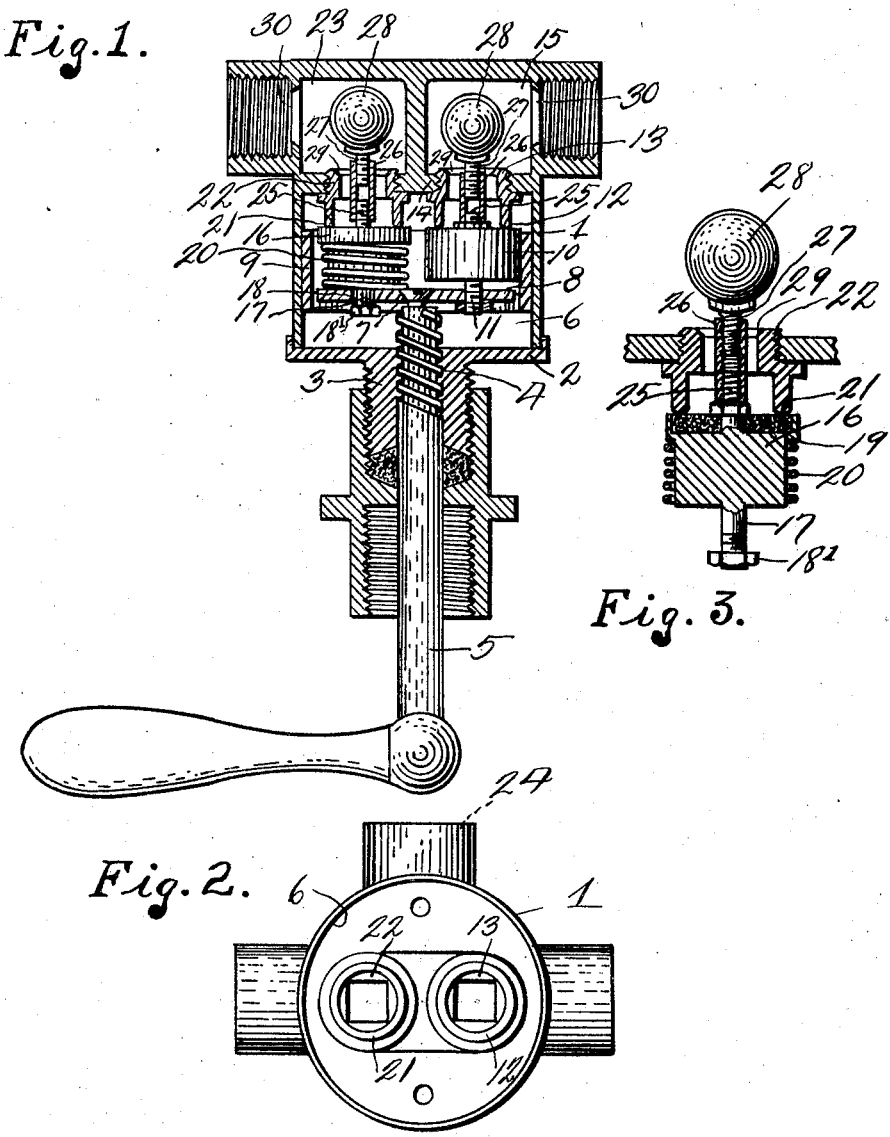
INVENTOR.
G. J. Morris June 14, 1927.  1,632,451
E. PITCHER
QUACK GRASS DIGGER
Filed Dec. 26, 1925   3 Sheets-Sheet 1
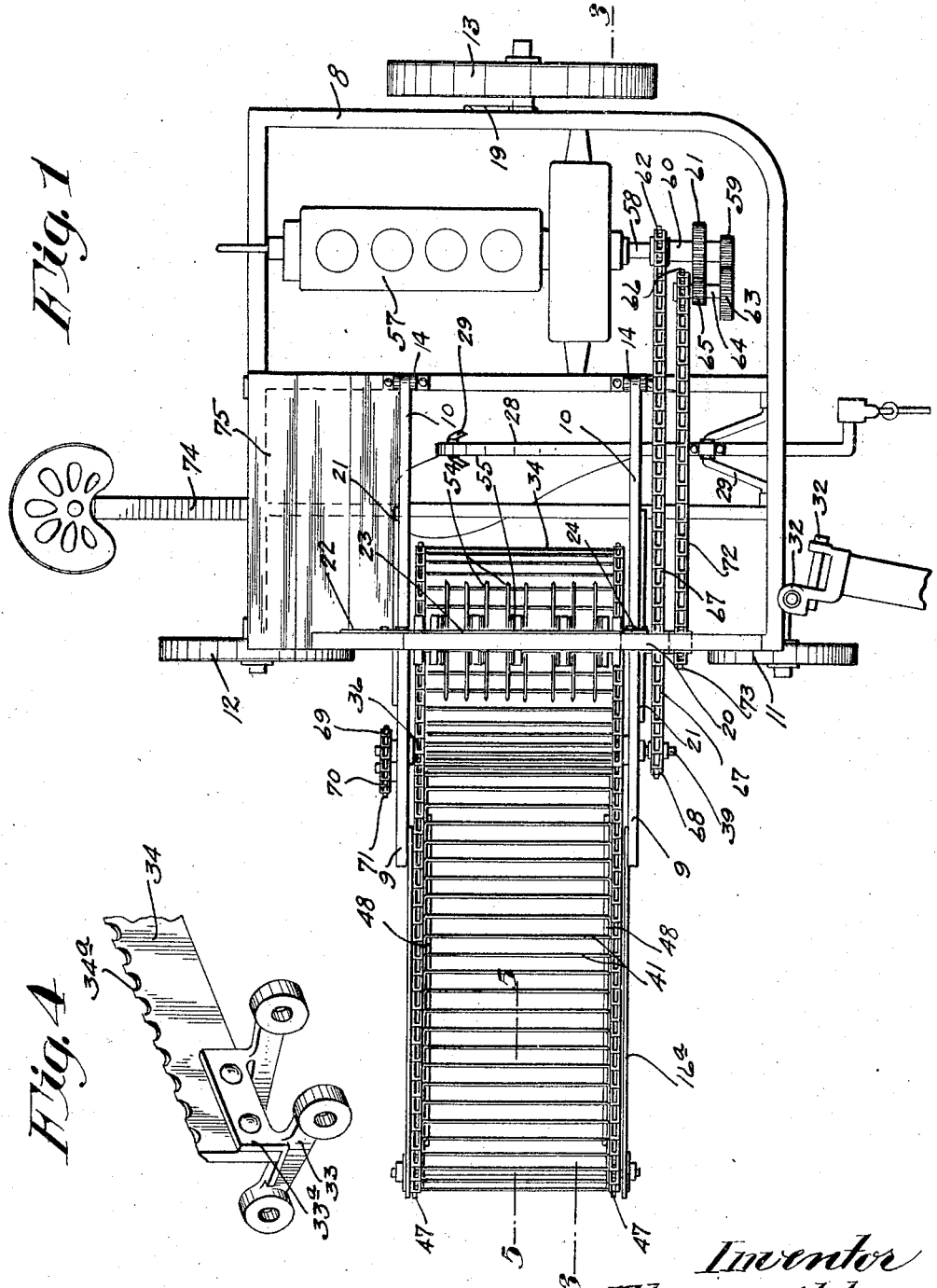
Inventor
Elmer Pitcher
By his Attorneys